INVENTORS:
SIDNEY TEPPER
HYMAN P. BOYDMAN
JOSEPH L. BONANNO
BY Breitenfeld & Levine
ATTORNEYS

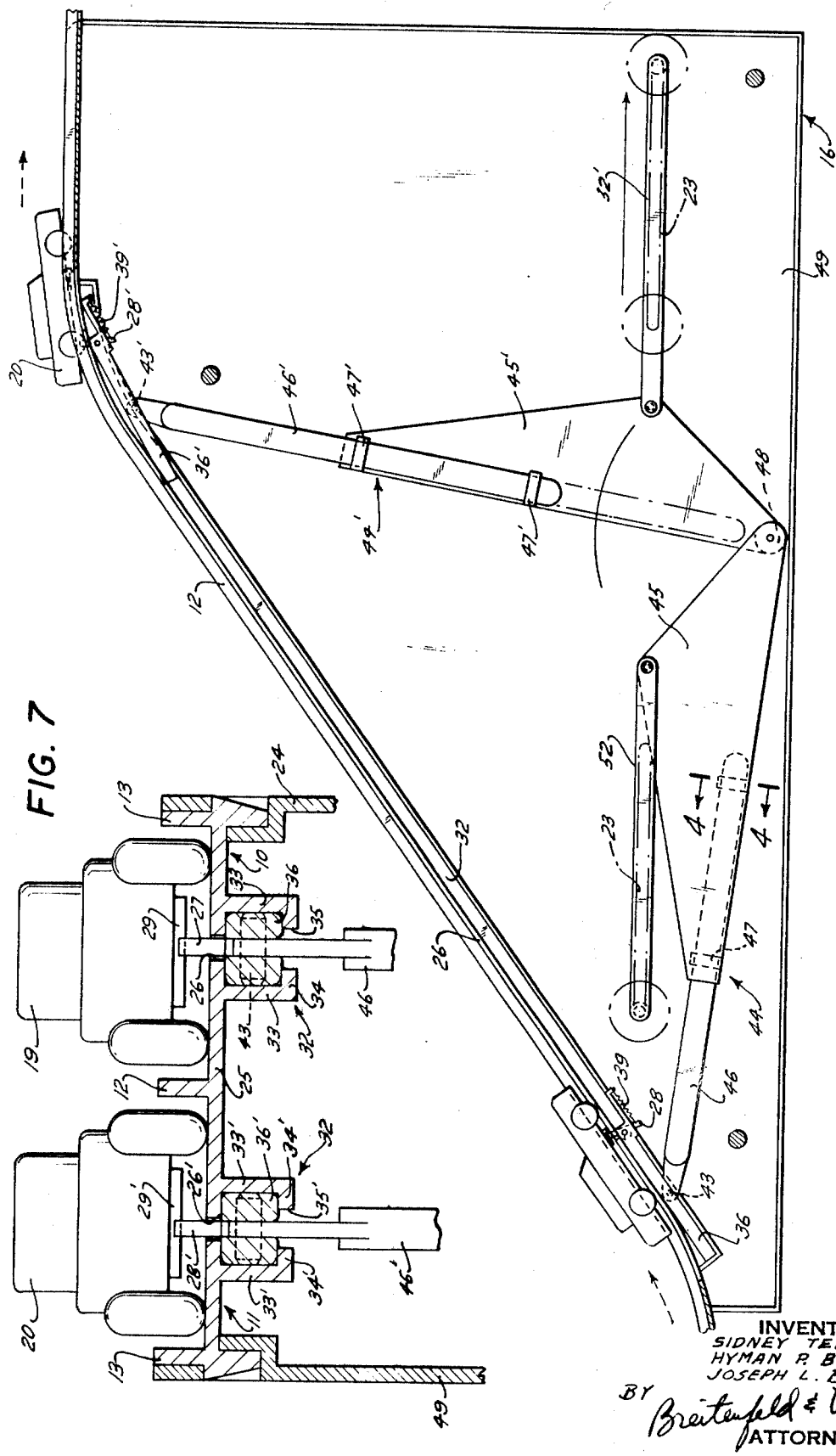

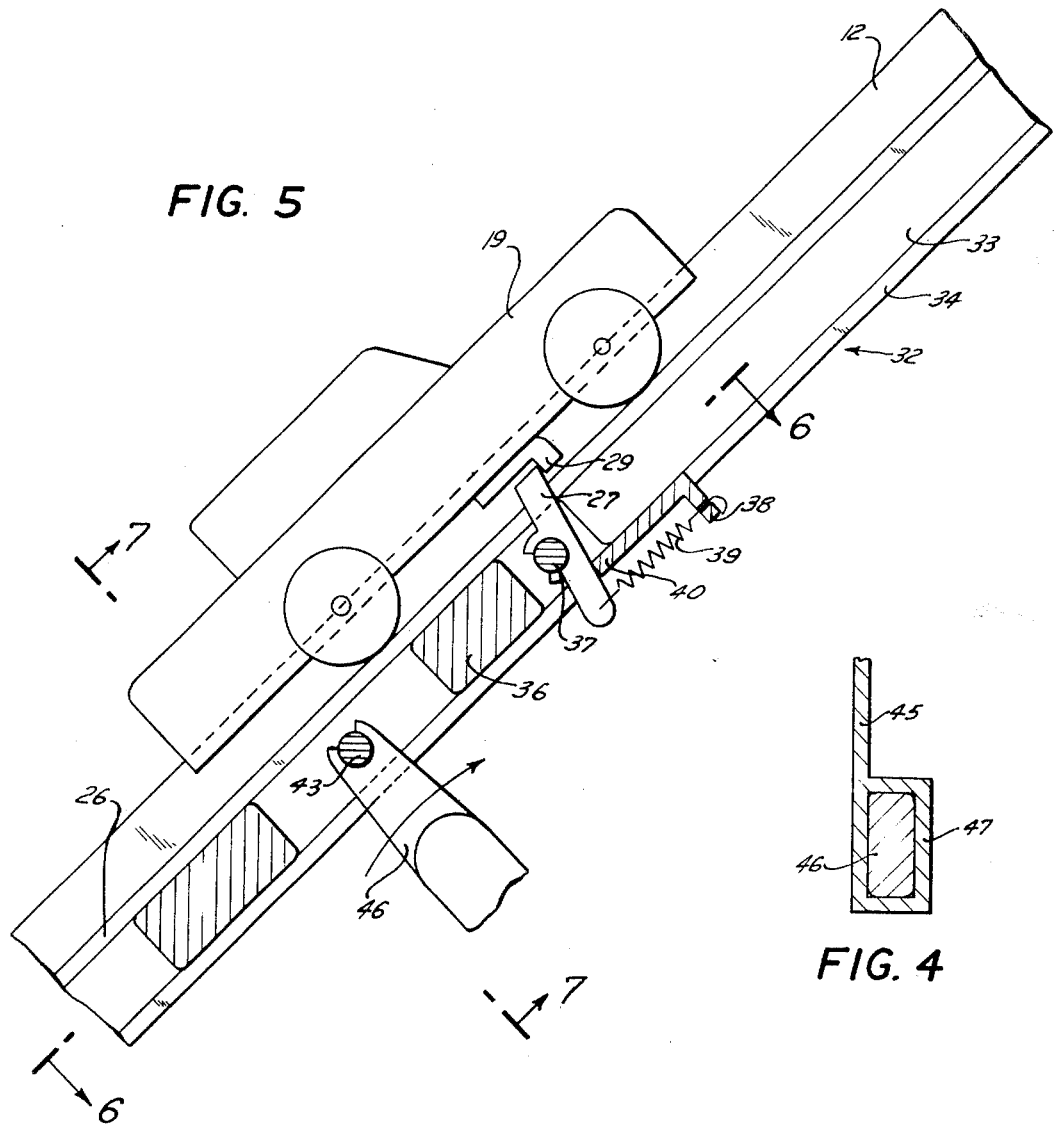
FIG. 5
FIG. 4
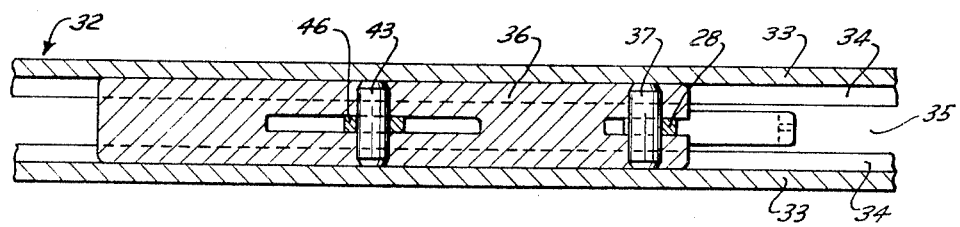
FIG. 6

May 26, 1970  S. TEPPER ETAL  3,514,108
RACING TOY HAVING MANUALLY MANIPULABLE VEHICLE PROPELLING MEANS
Filed Feb. 26, 1969  5 Sheets-Sheet 4

INVENTORS:
SIDNEY TEPPER
HYMAN P. BOYDMAN
JOSEPH L. BONANNO
BY Breitenfeld & Levine
ATTORNEYS

INVENTORS:
SIDNEY TEPPER
HYMAN P. BOYDMAN
JOSEPH L. BONANNO

BY Breitenfeld & Levine

ATTORNEYS

United States Patent Office 3,514,108
Patented May 26, 1970

3,514,108
**RACING TOY HAVING MANUALLY MANIPU-
LABLE VEHICLE PROPELLING MEANS**
Sidney Tepper, Millburn, Hyman P. Boydman, Springfield, and Joseph L. Bonanno, South Orange, N.J., assignors to Topper Corporation, a corporation of Delaware
Filed Feb. 26, 1969, Ser. No. 802,365
Int. Cl. A63f 9/14
U.S. Cl. 273—86                                10 Claims

ABSTRACT OF THE DISCLOSURE

Two side-by-side tracks of equal length support rollable vehicles each of which moves by gravity around entire track except for short uphill portion. Vehicle driving member located beneath, and movable along, each uphill track portion in response to movement of a handle operated by player. Driving member carries pawl or magnet for moving vehicle along uphill portion. Movement of handle transmitted to driving member by lever, meshing rack and gear drive, or belt and pulleys.

---

This invention relates to racing toys of the type in which rollable vehicles allocated to different players move around two or more side-by-side continuous tracks of equal length. More particularly, the invention relates to such toys wherein each track is inclined in one direction for most of its length to define a downhill portion along which a vehicle can move by gravity, a relatively short length of the track being inclined in the opposite direction to define an uphil portion joining the highest and lowest points of the downhill portion.

So that a vehicle can be caused to move along its track through successive unbroken cycles or laps, some means must be provided for applying an outside force to the vehicle so as to propel it along the uphill track portion. Once the vehicle reaches the top of the hill, it can be released, whereupon it moves around the track by gravity to the bottom of the uphill portion. At this point, the propelling means is again used to drive the vehicle up the hill.

In some toys of this type, the propelling means operates automatically. For example, a portion of the run of a continuous chain extends along the upper surface of the uphill track portion. The chain is moved continuously by an electric motor, and each vehicle has a depending part for engaging the chain. Thus, when a vehicle reaches the bottom of the uphill track portion, its depending part engages the moving chain and the vehicle is pulled up the hill by the chain, the vehicle and chain becoming disengaged at the top of the hill permitting the vehicle to roll around the track to the bottom of the hill where it once again engages the chain. Such toys have limited play value, since once the child places a vehicle on the track, and actuates the switch to turn on the motor for driving the chain, there is nothing more for the child to do but watch the toy perform.

The present invention stems from a recognition of the fact that the play value of a racing toy of the type described is greatly enhanced by making the vehicle-propelling means direclty controllable by a player. In this way, a child must develop the skill required to apply a propelling force to a moving vehicle when it arrives at the uphill track portion with a minimum of lost motion by the player resulting in a minimum loss of speed by the vehicle. Since the toy involves at least two tracks, players can compete against each other and are therefore encouraged to develop the skill just mentioned.

Competitive toys of this type have been suggested in the past, but they have usually involved complicated electromechanical or electromagnetic arrangements. Not only are such arrangements expensive to produce, but they do not offer the child the sense of directly affecting the movement of his vehicle, since his activity is limited to closing and opening a switch or switches at the appropriate time.

It is therefore an object of the present invention to provide a racing toy of the type described which involves no electricity but instead is purely mechanical, and in which the player manually operates the means for propeling a vehicle along the uphill track portion so that the vehicle is completely under his control during its uphill movement.

To carry out this objective, the invention provides a vehicle driving member or carriage slidable in a guideway directly beneath each uphill track portion. The carriage may carry a pawl or other projection extending upwardly through a slot in the track portion for engaging a depending part of a vehicle. Alternatively, the carriage may carry a magnet and the vehicle may carry a magnet or a piece of magnetic material. In any case, upward movement of the carriage causes upward movement of the vehicle. A handle manually manipulable by a player is furnished, the handle being mechanically connected to the carriage so that movement of the handle is transmitted to the carriage. The mechanical connection may comprise a lever pivoted to the toy base at one end and pivoted to the carriage at the other. Alternatively, the connection may include a toothed rack associated with the carriage and a gear, rotatable by movement of the handle, meshing with the rack. In another embodiment of the invention, the mechanical connection involves a cord or belt secured to the carriage and trained about a number of pulleys, including one movable by the handle means in a direction perpendicular to its axis of rotation.

Additional features and details of the invention will be apparent from the following description in which reference is made to the accompanying drawings.

In the drawings:

FIG. 3 is a vertical cross-sectional view taken on line 3—3 of FIG. 2;

FIG. 4 is a cross-sectional view taken on line 4—4 of FIG. 3;

FIG. 5 is an enlarged fragmentary view of a portion of FIG. 3;

FIG. 6 is a cross-sectional view taken on line 6—6 of FIG. 5;

FIG. 7 is a cross-sectional view taken on line 7—7 of FIG. 5;

Figure 1:
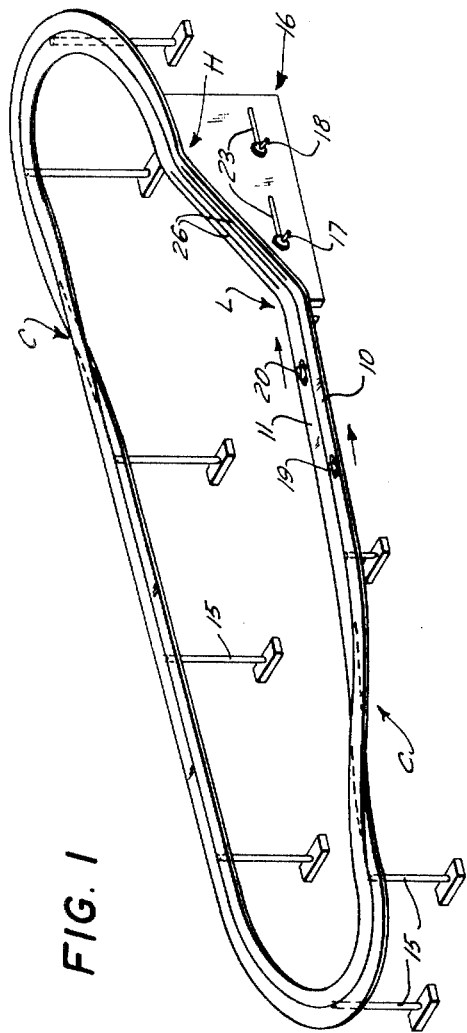
FIG. 1 is a perspective view of a racing toy according to the present invention.
Figure 2:
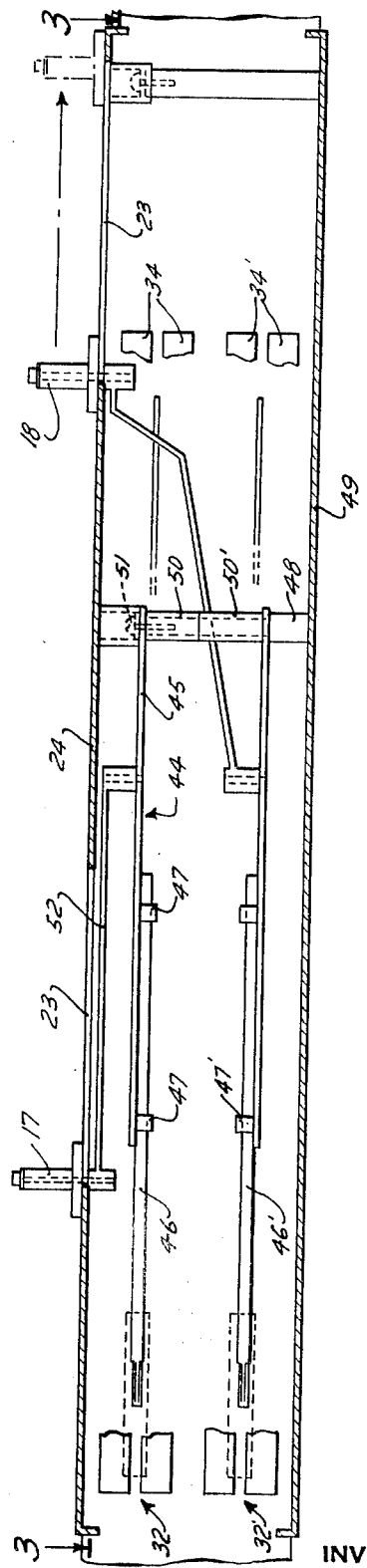
FIG. 2 is a bottom view of the toy base.

One embodiment chosen to illustrate the present invention is illustrated in FIGS. 1–7. The racing toy shown in FIG. 1 comprises two side-by-side continuous tracks 10 and 11 of generally elliptical contour. Although two tracks are shown in the present example, as many side-by-side tracks as desired may be used. The tracks may be formed of a molded plastic material, and may be provided in sections adapted to be snapped together to form the continuous tracks. As shown in FIG. 7, the two track regions of each section may be formed integrally, with an integral upstanding divider 12 separating the two tracks. The tracks are also provided with outer upstanding walls 13 to prevent the vehicles from rolling off the tracks.

Each track 10 and 11 has a downhill and an uphill portion. The downhill portion, which includes most of the track length, begins at the highest point of the track, in the region H, and extends in a counterclockwise direction (in FIG. 1) to the lowest point of the track, in the region L. The uphill portion is relatively short and extends from the region L to the region H. To make the two tracks of equal length, two cross-overs C are provided, track 11 crossing over track 10 at one cross-over, and track 10 crossing over track 11 at the other.

The downhill track portion could have slight rises along its length if desired. For the purpose of the present invention, it is important only that a wheeled vehicle arriving at the region H will travel under the influence of gravity alone to the region L. The downhill portions of the tracks 10 and 11 are supported by stanchions 15, and the uphill portions are supported by a base or housing 16 enclosing the mechanism for propelling vehicles along the uphill track portions.

When the toy is in use, each player controls a mechanism for propelling his vehicle along the uphill portion of its respective track. The vehicle then rolls along the downhill portion under the influence of gravity until it reaches the lower part of the uphill portion at which point the player again propels his vehicle up the hill. The player whose vehicle completes a predetermined number of laps or cycles around the track first is the winner, and the winner will ordinarily be the player most proficient at operating his vehicle-propelling mechanism.

In the present example, the housing 16 contains two vehicle-propelling mechanisms, one being operated by the handle 17 and the other by the handle 18. Handle 17 is actuated to propel a vehicle 19, illustrated as a toy automobile, along the uphill portion of track 10, and handle 18 is actuated to propel another toy automobile 20 along the uphill portion of track 11. Each handle 17 and 18 is slidably accommodated within a straight slot 23 formed in the front wall 24 (FIG. 2) of the housing 16, these slots serving to guide the movements of the handles when the latter are actuated. The floor 25 (FIG. 7) of the uphill portion of each track is formed with a central longitudinal slot 26, and a pawl projects upwardly through each slot. As each handle 17 or 18 is shifted from its leftwardmost position in FIG. 1 to its rightwardmost position, the pawl 27 or 28, respectively, (FIGS. 5 and 7) associated with it moves from the lower end of its respective slot 26 to the upper end. Each vehicle 19 and 20 is provided with a depending lip 29 (FIGS. 5 and 7) adapted to be engaged by one of the pawls.

Thus, when the vehicle 19, for example, arrives at the lower region of the uphill portion of track 10, the appropriate player shifts handle 17 to the right so that the pawl 27 engages the depending lip 29 of the vehicle and propels it up the hill. Thereafter, the player moves the handle 17 back toward the left, returning the pawl 27 to the bottom of the uphill track portion, in preparation for again propelling the vehicle 19 up the hill. To a great extent, the skill required in playing with the present toy involves the ability to actuate the handle 17 or 18 at precisely the right time so that the respective pawl engages the lip of the vehicle before the latter comes to a stop on the uphill track portion. In this way, full advantage is taken of the initial movement of the vehicle up the hill due to its inertia.

The mechanisms for transmitting movements of the handles 17 and 18 to their respective pawls 27 and 28 are illustrated in detail in FIGS. 2–7. The two mechanisms are almost identical, and therefore except for the points at which they differ only one will be described. However, corresponding parts of the other mechanism bear identical reference numerals followed by a prime. Mounted on the lower face of each uphill track portion is a guideway 32 (FIGS. 3 and 5–7) defined by two parallel walls 33, which may be integrally formed with the track floor 25, each having an inwardly directed flange 34, the space between the flanges defining a slot 35. The guideway 32 extends for substantially the full length of the uphill track portion.

Slidably arranged within the guideway 32 is a vehicle driving member or carriage 36 carrying near its front end a transverse pin 37 (FIGS. 5 and 6) upon which pawl 28 is pivotally supported. At the front end of the carriage is a depending finger 38 to which one end of a tension spring 39 is secured, the other end of the spring being secured to the lower end of the pawl 28. The spring 39 normally holds the pawl 28 against an abutment portion 40 of the carriage 36 so that the pawl cannot rotate in a counterclockwise direction when in the position shown in FIG. 5. Consequently, when the carriage 36 is moved upwardly along the guideway 32, this movement is transmitted to the lip 29 of vehicle 19 by the pawl. However, the pawl can rotate clockwise, against the force of spring 39, so that when vehicle 19 enters the uphill track portion, lip 29 can move past the pawl. In other words, when vehicle 19 is moving from the left toward the right, i.e., uphill, and the front face of its lip 29 strikes the pawl 28 rotating it clockwise, the upper end of the pawl moves toward the slot 26 permitting the vehicle to pass. The pawl is then immediately snapped into a position for engaging the rear face of the lip 29 by the spring 39.

The carriage 36 carries another transverse pin 43 to which one end of a lever 44 (FIGS. 2 and 3) is pivotally connected. Lever 44 comprises two parts, namely, a flat triangular member 45 and an extension 46 slidably arranged within a pair of straps 47 (see also FIG. 4) secured to member 45. It is the free end of extension 46 which is pivotally connected to the carriage 36, this end passing through the slot 35 in the guideway 32. The opposite end of the member 45 is pivotally supported on a post 48 projecting horizontally from the rear wall 49 of the housing 16. For more than half its length, the post 48 is reduced in diameter so that it is rotatably accommodated within hollow bosses 50 and 50' (FIG. 2) fixed to the members 45 and 45', respectively. The bosses are prevented from sliding endwise off the post 48 by a screw 51 threaded into the post. Since the distance between the post 48 and the guideway 32, as viewed in FIG. 3, depends upon the angle of the line drawn between them, the sliding relationship between the extension 46 and the member 45 permits the effective length of the lever 44 to be varied as the lever pivots about the post 48.

A link 52 pivotally connects the handle 17 to one corner of the triangular member 45 and serves to transmit horizontal shifting movement of the handle along its slot 23 to the member 45. Lever 44 is thereby caused to rotate about post 48, and via connection 43 move carriage 36 along its guideway 32. Although the link 52 is straight, link 52' is kinked between its ends so that it may be connected to member 45' located behind member 45. The arrangement is such that the handles 17 and 18 may be moved horizontally, along their respective slots 23, through precisely the same distance, and levers 44 and 44' swing about colinear axes through exactly the same lengtth arc. Consequently, neither player is given any mechanical advantage which the other player does not also enjoy.

Figure 8:
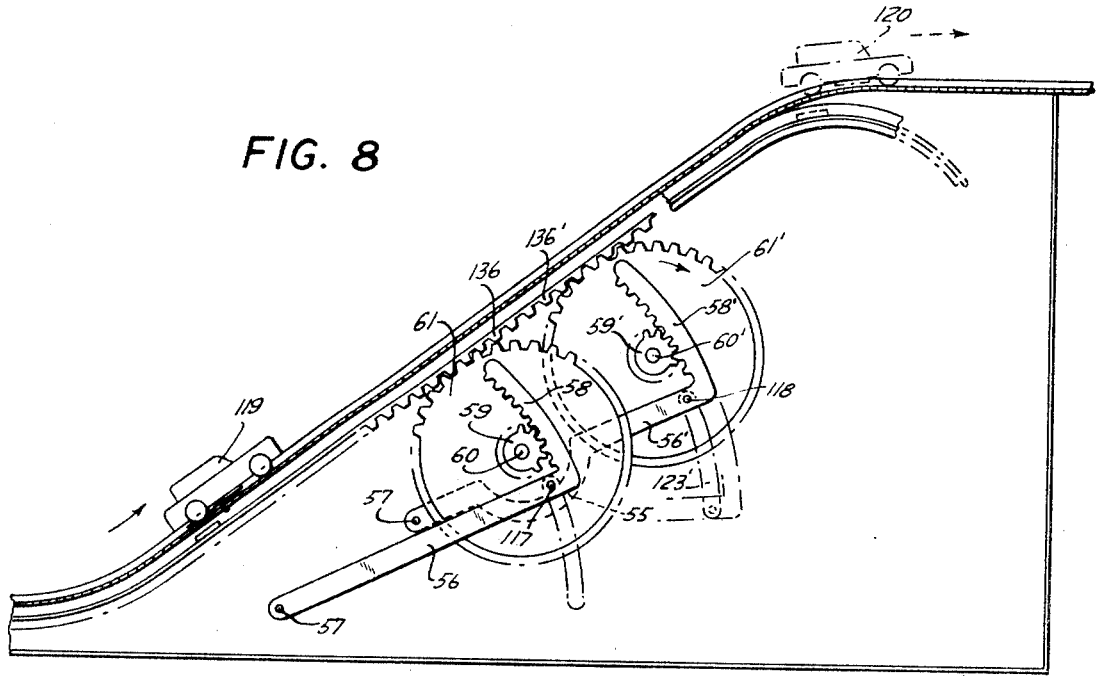
FIG. 8 is a view similar to FIG. 3 of an alternative embodiment of the invention.
Figure 9:
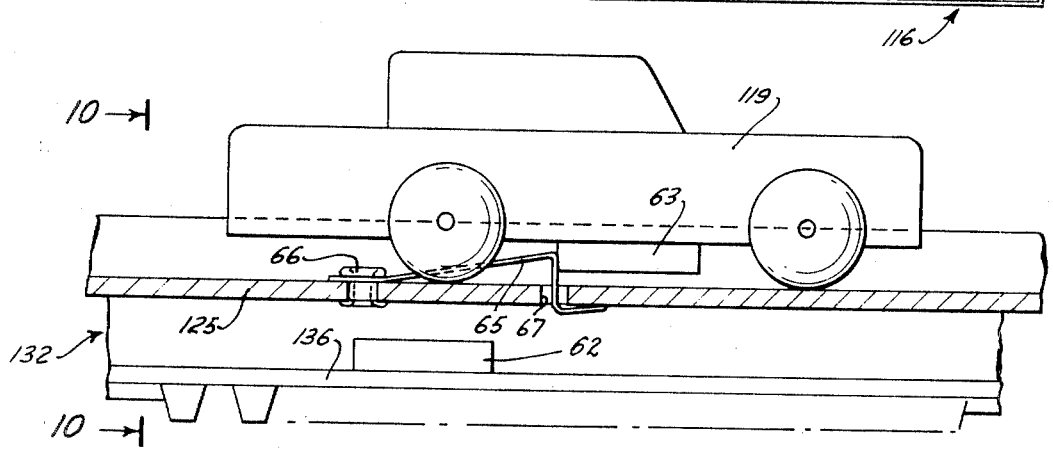
FIG. 9 is an enlarged fragmentary view of a portion of FIG. 8.
Figure 10:
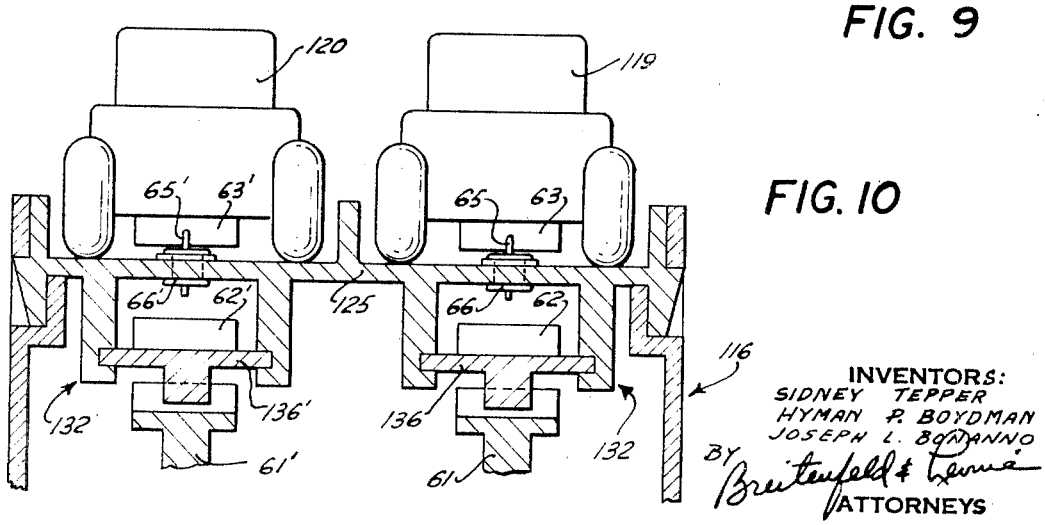
FIG. 10 is a cross-sectional view taken on line 10—10 of FIG. 9.

An alternative vehicle driving mechanism arrangement is illustrated in FIGS. 8–10. In this embodiment, the mechanism associated with each track includes a substantially L-shaped lever 56 (since both mechanisms are identical, only one will be described and corresponding parts of the other mechanism bear the same reference numerals followed by a prime) pivotally secured to the housing 116 (parts corresponding to those of FIGS. 1–7 bear the same reference numerals preceded by a one) at 57. A handle 117 projects laterally from lever 56 through an arcuate slot 123 in the front wall of the housing, the lever 56' having a similar handle 118 projecting through slot 123'. One leg 58 of lever 56 is formed with gear teeth along one edge which mesh with a pinion 59 fixed to a shaft 60 journaled at its ends in the front and rear walls of the housing 116. Shaft 60 also carries a gear 61, the teeth of which mesh with the teeth of a flexible rack 136, serving as the vehicle driving member. Rack 136 is slidably arranged within a guideway 132, the upper end of which is bent away from the track so that the end portion of rack 136 may move into the housing 116 during its upward movement, without striking the end wall 64 of the housing. The lever 56' is formed with an arched portion 55 to avoid interference between the lever and the shaft 60.

In this example, motion of the rack 136 is transmitted to the vehicle 119 by a permanent magnet 62 fixed to the upper face of the rack. The magnet 62 can perform its function if the vehicle 119 is fabricated of magnetic material or if it carries a plate of magnetic material on its lower face. Preferably, however, the vehicle is provided on its lower face with a permanent magnet 63, and preferably like poles of the magnets face each other so that the magnets repel each other. In this way, very small and inexpensive magnets may be employed, and yet the force of repulsion between them is sufficient to transmit a propelling force to the vehicle 119 when the rack 136 moves along its guideway 132. Furthermore, the repulsion force between the magnets tends to lift the car 119 off its track, thus reducing the friction force between the track surface and the car wheels. Also, when the vehicle reaches the top of the uphill track portion, the repulsion between the magnets acts as an elastic force to aid in propelling the car on its way. These benefits contrast with the situation when two magnets which attract each other are used. In such a case, the frictional force is increased due to the magnetic force pulling the car wheels against the track, and the car has some difficulty breaking away at the top of the incline due to the force of magnetic attraction. When a magnet is employed as just described, no slot comparable to the slots 26 need be provided in the floor of each track, since the magnetic field is effective through the track material.

Near the lower end of its uphill portion, the floor 125 of each track is furnished with a resilient stop defined by a resilient wire 65 anchored to the track at one end by a rivet 66. The free end of the wire 65 is bent downwardly to pass through a hole 67 in the floor 125, and then forwardly so that it abuts against the lower surface of the floor. When moving vehicle 119 reaches the bottom of the uphill track portion and due to its inertia begins moving up the hill, the forward end of magnet 63 slides over wire 65, the latter moving downwardly through hole 67 to permit the vehicle to pass. Consequently, wire 65 forms no obstacle to forward movement of the vehicle. However, once the magnet 63 passes over it, wire 65 springs back to its normal position, shown in FIGS. 9 and 10, into the path of backward movement of the vehicle magnet 63. Thus, cooperation of the stop 65 and magnet 63 (serving in this case simply as an abutment) prevents the vehicle 119 from rolling backward off the uphill track portion, so that a player can never lose complete control of the vehicle, i.e., when the vehicle is resting against stop 65, a player can manipulate his respective handle 117 or 118 to bring the magnet 62 opposite to vehicle magnet 63 and propel the vehicle up the hill.

To propel his vehicle up the hill, a player shifts the handle 117 or 118 downwardly along slot 123, thereby pivoting lever 56 about pivot 57. The gear teeth of leg 58 cause rotation of pinion 59 which in turn rotates shaft 60 and gear 61, all in a clockwise direction in FIG. 8. Gear 61 thereby slides rack 136 upwardly along guideway 132, carrying magnet 62 with it. The cooperating fields of magnets 62 and 63 transmit this upward movement of the rack to the vehicle. The rack 136 is returned to its lower position by shifting the handle 117 upwardly along slot 123, in preparation for the next pass by the vehicle.

While in the embodiment just described a magnet is employed to transmit motion from the vehicle driving member to the vehicle, and in the embodiment of FIGS. 1–7 a pawl is used for this purpose, it should be mentioned that these elements are interchangeable, i.e., any of the embodiments disclosed herein can include either a pawl or a magnet as desired.

Figure 11:
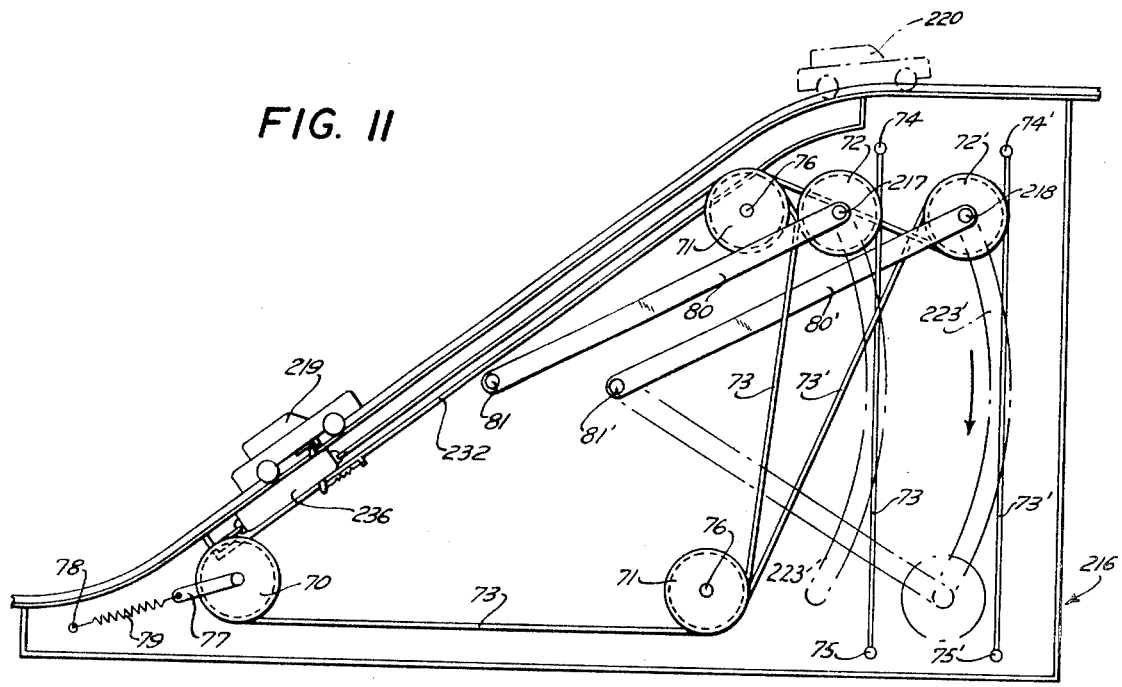
FIG. 11 is a view similar to FIG. 3 of another alternative embodiment of the invention.
Figure 12:
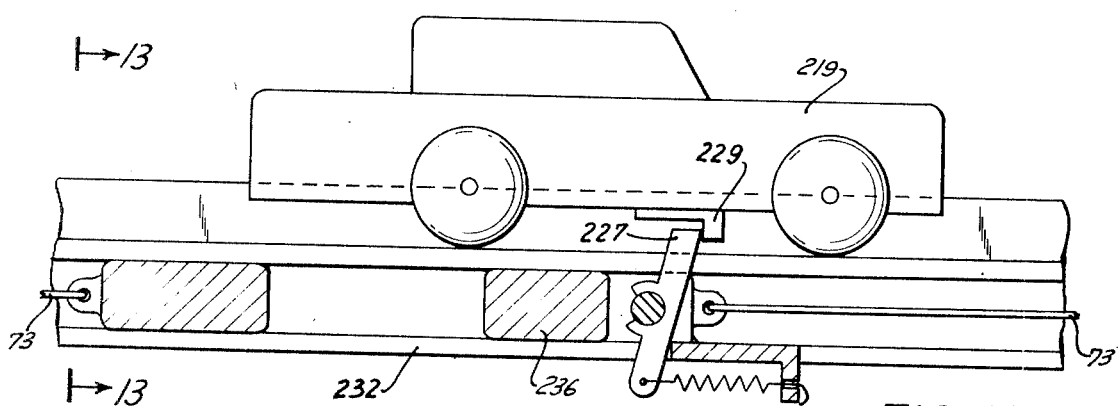
FIG. 12 is an enlarged fragmentary view of a portion of FIG. 11.
Figure 13:
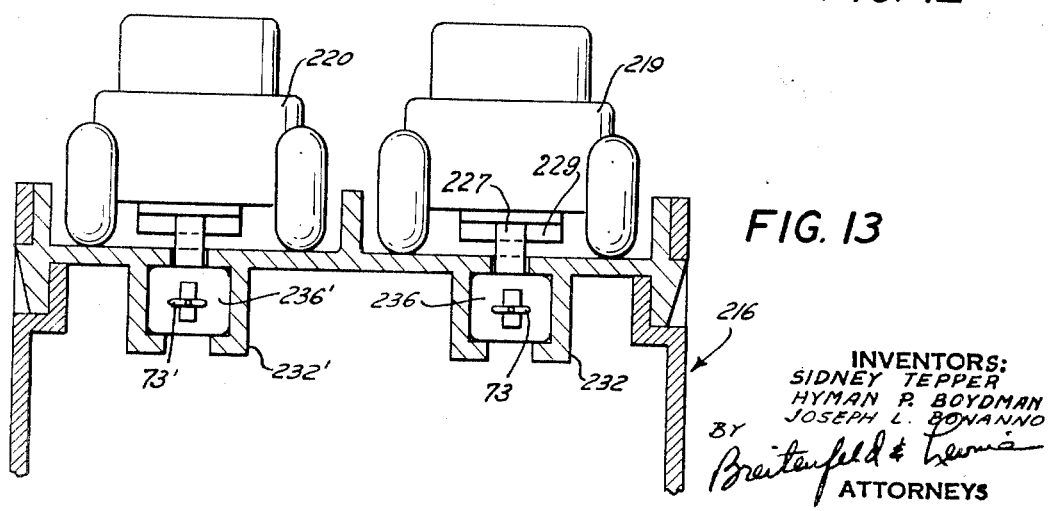
FIG. 13 is a cross-sectional view taken on line 13—13 of FIG. 12.

Another alternative vehicle driving mechanism arrangement is shown in FIGS. 11–13. In this embodiment, the mechanism associated with each track includes four pulleys 70, 71, and 72 (since both mechanisms are identical, only one will be described and corresponding parts of the other mechanism bear the same reference numerals followed by a prime) over which is trained a single flexible belt or cord 73, one end of which is fixed to the housing 216 (parts corresponding to those of FIGS. 1–7 bear the same reference numerals preceded by a two) at 74, and the other end of which is fixed to the housing at 75. The pulleys which would bear reference numerals 70' and 71' are located directly behind pulleys 70 and 71 and therefore are not visible in FIG. 11.

Pulleys 71 are rotatably mounted on fixed shafts 76 extending horizontally between the front and rear walls of housing 216. Pulley 70 rotates on a shaft carried between the arms of a yoke 77, one end of the yoke being connected at 78 to the housing by a tension spring 79. Spring 79 serves to maintain the belt 73 taut at all times. Pulley 72 is rotatably mounted on one end of a link 80, the other end of which is pivotally secured to housing 216 at 81. A handle 217 projects laterally from link 80, along the axis of rotation of pulley 72, through an arcuate slot 223 in the front wall of the housing, the link 80' having a similar handle 218 projecting through slot 223'.

Beginning at its end 74, belt or cord 73 first passes beneath pulley 72, around the top of upper pulley 71, and then along guideway 232 for the vehicle driving member or carriage 236 until it reaches a point of attachment to carriage 236. The belt continues from carriage 236 (the belt may actually be in two parts connected by the carriage 236) around pulley 70, around lower pulley 71, and then around the top of pulley 72, terminating at point 75. When a player wishes to propel his vehicle 219 up the hill, he shifts his handle 217 downwardly along slot 223, thereby pivoting link 80 about pivot 81. Since the belt 73 is formed of inelastic, though flexible, material, movement of the handle 217 and hence pulley 72 downwardly produces movement of the belt 73 in a clockwise direction (in FIG. 11) around the triangle whose corners are defined by the pulleys 70 and 71. Consequently, the portion of the belt 73 parallel to the guideway 232 moves in an upward direction pulling the carriage 236 along with it. This movement of the carriage is transmitted to the vehicle 219 by cooperation of the pawl 227, carried by the carriage, with lip 229, depending from the vehicle.

The invention has been shown and described in preferred form only, and by way of example, and it is understood, therefore, that many variations may be made in the invention which will still be comprised within its spirit.

What is claimed is:
1. A racing toy comprising:
  at least two side-by-side continuous toy tracks of equal length, a relatively short length of each track being inclined to define an uphill portion, substantially all the remaining length of each track being inclined to define a downhill portion, a plurality of gravity operated toy vehicles for movement along said tracks, a vehicle driving member movably mounted beneath each uphill track portion, means for guiding the movements of said driving member along a path parallel to its respective uphill track portion, means carried by said driving member for transmitting movements of the latter to one of said vehicles rollably supported on the track portion above, separate handle means manually movable by each player, and means mechanically connecting each handle to one of said driving members for transmitting the movement of each handle to its respective driving member, whereby one of said vehicles allocated to a player may be caused to traverse its respective uphill track portion upon operation of one of said handles by the player so as to produce appropriate movement of the respective driving member.

2. A racing toy as defined in claim 1 wherein each uphill track portion is furnished with a longitudinal slot, and said transmitting means carried by said driving member is an element projecting upwardly through said slot and above the upper surface of said uphill track portion, said element being slidable within said slot and adapted to engage a vehicle supported on said uphill track portion.

3. A racing toy as defined in claim 2 wherein said element is resiliently biased upwardly so that it can be moved downwardly by a vehicle passing over it while traveling in an uphill direction, but said element remaining in its uppermost position when contacted by a vehicle rolling down said uphill track portion so as to halt such movement of the vehicle and transmit upward movement of said driving member to the vehicle.

4. A racing toy as defined in claim 2 wherein said element is a pawl pivotally mounted on said driving member, and including means for resiliently biasing said pawl upwardly, said pawl moving downwardly against the force of said biasing means when contacted by a vehicle traveling in an uphill direction so that the vehicle can move past said pawl, and means preventing said pawl from moving downwardly when contacted by a vehicle which has moved past it, whereby the pawl serves to limit the downhill movement of such a vehicle on the uphill track portion and to transmit upward movement of said driving member to the vehicle.

5. A racing toy as defined in claim 1 wherein each of said vehicles carries a magnetic part, and said transmitting means carried by said driving member is a magnet cooperable with said magnetic part, the magnetic field of said magnet being operative through said uphill track portion.

6. A racing toy as defined in claim 1 including a base supporting said uphill track portions, and wherein each of said transmitting means includes a lever pivotally mounted on said base, each of said handle means being pivotally connected to its respective lever, and each lever being pivotally connected to one of said vehicle driving members, whereby movement of said handle means produces movement of its respective lever and vehicle driving member.

7. A racing toy as defined in claim 6 wherein said uphill track portions are substantially straight, and said levers each include two mutually slidable parts, whereby the effective length of said lever may be varied, one of said parts being pivoted to said base and the other being pivoted to said vehicle driving member, said parts sliding with respect to each other as said lever is pivoted.

8. A racing toy as defined in claim 6 wherein the axes about which said levers are pivoted to said base are all colinear, and the points of connection between said handle means and their respective levers are all aligned along a line parallel to said colinear axes.

9. A racing toy as defined in claim 1 wherein each of said vehicle driving members includes a toothed rack, and said transmitting means each includes a gear meshing with one of said racks, said gear being rotatable in response to movements of its respective handle means.

10. A racing toy as defined in claim 1 including a base supporting said uphill track portions, and wherein each of said transmitting means includes a plurality of rotatable pulleys supported by said base, and a flexible belt trained about said pulleys, a portion of the length of travel of each belt being parallel to one of said uphill track portions, one of said vehicle driving members being secured to said parallel portion of each belt, each belt being advanced around said pulleys in response to movement of its respective handle means, whereby upon appropriate movement of either of said handles its respective belt and vehicle driving member moves parallel to said uphill track portions.

References Cited

UNITED STATES PATENTS

| | | | |
|---|---|---|---|
| 749,677 | 1/1904 | Jackman | 104—60 |
| 1,545,676 | 7/1925 | Mantley. | |
| 1,724,447 | 8/1929 | Abbott et al. | 273—120 |
| 1,729,049 | 9/1929 | Olsen. | |
| 1,780,081 | 10/1930 | Keiser. | |
| 2,167,985 | 8/1939 | Levay. | |
| 2,218,164 | 10/1940 | Carpenter. | |
| 2,551,806 | 5/1951 | McKeever. | |
| 2,767,986 | 10/1956 | Newberry. | |
| 3,108,810 | 10/1963 | Wiley. | |
| 3,233,363 | 2/1966 | Maury. | |
| 3,352,251 | 11/1967 | Einfalt. | |
| 3,337,985 | 8/1967 | Ryan et al. | 104—60 X |

FOREIGN PATENTS

| | | |
|---|---|---|
| 882,269 | 11/1961 | Great Britain. |

RICHARD C. PINKHAM, Primary Examiner

T. ZACK, Assistant Examiner

U.S. Cl. X.R.

104—60, 172; 273—120